United States Patent [19]

Powers

[11] 4,017,877
[45] Apr. 12, 1977

[54] DEVICE FOR PREVENTING FOGGING OF FILM WITHIN A CAMERA BACK

[75] Inventor: Robert H. Powers, Rochester, N.Y.
[73] Assignee: Itek Corporation, Lexington, Mass.
[22] Filed: Oct. 2, 1975
[21] Appl. No.: 618,991
[52] U.S. Cl. .............................. 354/277; 354/281
[51] Int. Cl.² ........................................ G03B 17/26
[58] Field of Search .......... 354/275, 277, 281, 283, 354/83, 174

[56] References Cited
UNITED STATES PATENTS

| | | | |
|---|---|---|---|
| 1,527,476 | 2/1925 | Gianetto | 352/75 X |
| 2,223,525 | 12/1940 | Miller | 352/75 |
| 2,505,661 | 4/1950 | Briskin et al. | 352/76 |
| 3,748,984 | 7/1973 | Gold | 354/277 |
| 3,886,570 | 5/1975 | Asano et al. | 354/174 |

Primary Examiner—L. T. Hix
Assistant Examiner—Alan Mathews
Attorney, Agent, or Firm—Homer O. Blair; Robert L. Nathans; Gerald H. Glanzman

[57] ABSTRACT

A pivotable camera back is provided containing a film cartridge having a movable light sealing member for preventing light from entering the cartridge when the camera back housing is pivoted to an open position for access thereto, together with a sealing member actuation device for causing the light sealing member to open with respect to the cartridge feed orifice to permit photosensitive material to be fed to the imaging area upon the closing of the camera back housing.

3 Claims, 2 Drawing Figures

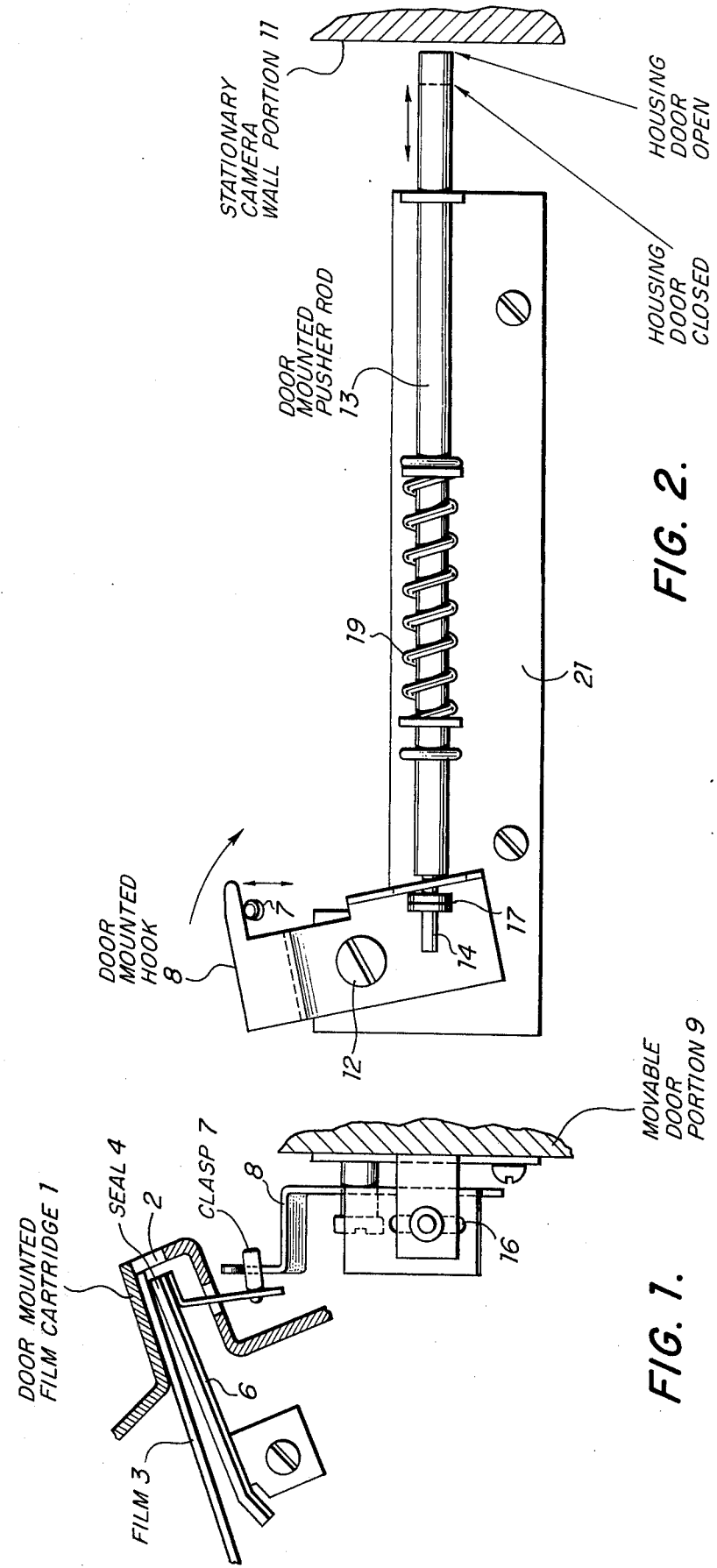

DEVICE FOR PREVENTING FOGGING OF FILM WITHIN A CAMERA BACK

BACKGROUND OF THE INVENTION

In a camera processor, it is often necessary to replace one cartridge containing photosensitive material with another cartridge by opening the camera back. It is also desirable to prevent fogging of the photosensitive material by light entering the cartridge when the movable camera back housing containing the cartridge is in the open position.

It is thus desirable to provide a system for automatically opening the cartridge feed lip when the camera back housing is closed and to close the feed lip to prevent fogging when the camera back is opened.

SUMMARY OF THE INVENTION

In accordance with a preferred embodiment of the invention, a sealing member actuation means is mounted upon a movable camera back and includes a spring biased pusher rod, which is mechanically coupled to a hook and clasp device, which in turn engages a movable light sealing member positioned at the feed orifice of the cartridge of photosensitive material positioned within the movable camera back. When the camera back is opened to replace one film cartridge with another, the sealing member releases, which automatically prevents light from entering the cartridge and fogging the material. When the camera back is closed, the pusher rod causes the hook to rotate and cause the sealing member to unblock the feed orifice which permits photosensitive material to be driven out of the cartridge. Since the camera back itself is light sealed, the unblocking of the cartridge feed orifice does not cause fogging of the photosensitive material.

Other objects, features, and advantanges of the present invention will become apparent upon the perusal of the following description taken in conjunction with the drawings in which:

FIG. 1 discloses a key portion of the cartridge sealing member within the movable camera back and FIG. 2 illustrates the camera back mounted sealing member actuation means.

DETAILED DESCRIPTION

In FIG. 1, a portion of a conventional film cartridge 1 is disclosed having a feed orifice 2 with a stationary seal element 3 co-acting with an upwardly spring biased movable element 4, the latter being in turn mounted upon a springy strip element 6, which may be bent and released to open and close the movable light sealing device.

The sealing member actuation means includes a clasp element 7 which may be pulled down by a door mounted hook 8, to bend spring element 6. The sealing member actuation means is mounted upon the movable door portion 9 of the camera back which itself is hinge mounted to the camera wall portion 11. Hook 8 is pivoted about stud 12 and is rotated by door mounted pusher rod 13. A terminal portion 14 passes through slot 16, illustrated in FIG. 1 and is retained within the slot by means of washer rings 17. The pusher rod is biased to the right by spring 19 so that the door mounted hook 8 assumes the position shown wherein the clasp 7 is not pulled downwardly so that the light sealing member 4 prevents light from entering the cartridge to fog the photosensitive material. This is the situation when the camera back is opened, and the pusher rod is spaced from the stationary camera wall portion 11, as illustrated at the right-hand portion of FIG. 2.

The pivoting of the entire camera back (carrying film cartridge 1) with respect to the stationary camera wall portion 11, causes the camera back to assume the closed condition wherein the interior thereof is now light sealed. Just before the camera back assumes the fully closed condition, the right-hand terminal portion of the pusher rod presses against stationary camera wall portion 11 and is translated to the left against the biasing force of spring 19, to in turn push against the pivoted door mounted hook to cause it to pivot about stud 12. This action in turn causes clasp element 7 to be pulled in a downward direction thereby to in turn pull down on seal element 4 to open the cartridge orifices to thereby permit photosensitive material to be driven out of the cartridge to the imaging area. Since the camera back is now light sealed, no fogging of material within the cartridge will occur. When the camera back is again opened, the pusher rod will be again displaced to the right by virtue of spring 19, and the fact that the door is becoming opened again so that wall portion 11 does not press against the pusher rod. The sealing member actuation means, exclusive of clasp 11, is mounted upon plate 21 which is itself mounted upon the movable door as illustrated.

Thus, it should now be appreciated that the movable light sealing member is automatically opened when the camera back is closed and is automatically closed when the camera back is opened by virtue of the sealing member actuation apparatus mounted upon the movable camera back.

While a preferred embodiment of the invention has been described, the teachings of this invention will readily suggest many other embodiments to those skilled in the art.

What is claimed is:

1. A movable camera back member coupled to a camera, which is placed in a closed position with respect to said camera for exposure of photosensitive material and in an open condition for access thereto comprising:
   a. a cartridge within said camera back member having a feed orifice means therein through which said photosensitive material passes;
   b. a light sealing member associated with said cartrdige for sealing off said feed orifice means when said sealing member is placed in a closed position and for opening said feed orifice means when said sealing member is placed in an open position; and,
   c. sealing member actuation means for causing said sealing member to be placed in said open position when said movable camera back member is placed in said closed position for exposure, and for causing said sealing member to be placed in said closed position when said movable camera back member is placed on said open position, said sealing member actuation means further including a pusher rod mounted upon said camera back housing which is translated back and forth with respect to said camera back housing upon the opening and closing of said camera back member, and wherein said pusher rod is spring biased for permitting said rod to be translated upon contacting a wall portion of said camera when said camera back member is placed in said closed position with respect to said camera, said sealing member actuation means further including a clasp member coupled to said pusher rod for actuating said light sealing member upon the translation of said pusher rod and wherein a hook member is coupled between said clasp member and said pusher rod for actuating said clasp member upon the translation of said pusher rod.

2. The combination as set forth in claim 1 wherein said light sealing member is mechanically biased to close said cartridge.

3. A movable camera back member coupled to a camera, which camera back member is placed in a closed position with respect to said camera for exposure of photosensitive material and in an open position for access thereto comprising:
  a. a cartridge within said movable camera back member having feed orifice means therein through which said photosensitive material passes;
  b. a movable light sealing member associated with said cartridge and mechanically biased by a closure spring for sealing off said orifice means when said sealing member is placed in a closed position and for opening said orifice means when said sealing member is pulled in a direction against said closure spring.
  c. sealing member actuation means for causing said sealing member to assume said open position when said movable camera back member is placed in said closed position for exposure and for causing said sealing member to be placed in said closed position when said movable camera back member is placed in said open position, and further including a pivotable hook means for pulling down on said clasp means coupled to said light sealing member when said movable camera back member is placed in said closed position to enable feeding of photosensitive material through said feed orifice means and for causing said light sealing member to seal off said orifice means when said movable camera back member is placed in said open position, said hook means being pivoted to pull down on said clasp means by a spring biased pusher rod mounted upon said movable camera backmember, which pusher rod presses against a stationary wall portion of said camera when said movable camera back member is placed in said closed position, thereby to in turn push against said hook means to cause it to pivot and pull said clasp means to open said sealing member.

* * * * *